(12) United States Patent
Tang

(10) Patent No.: US 12,329,317 B1
(45) Date of Patent: Jun. 17, 2025

(54) OIL GUIDING STRUCTURE AND COOKING DEVICE

(71) Applicant: Qingpan Tang, Guangdong (CN)

(72) Inventor: Qingpan Tang, Guangdong (CN)

( * ) Notice: Subject to any disclaimer, the term of this patent is extended or adjusted under 35 U.S.C. 154(b) by 0 days.

(21) Appl. No.: 19/001,634

(22) Filed: Dec. 26, 2024

(51) Int. Cl.
*A47J 37/07* (2006.01)

(52) U.S. Cl.
CPC ....... *A47J 37/0786* (2013.01); *A47J 37/0704* (2013.01)

(58) Field of Classification Search
CPC ..................... A47J 37/0786; A47J 37/0704
See application file for complete search history.

(56) References Cited

U.S. PATENT DOCUMENTS

| | | |
|---|---|---|
| 2013/0108750 A1 | 5/2013 | Vitagliano |
| 2015/0047625 A1 | 2/2015 | Weil |
| 2023/0190036 A1 | 6/2023 | Belmont |
| 2024/0200782 A1 | 6/2024 | Smith et al. |

*Primary Examiner* — Jeffrey T Carley
*Assistant Examiner* — Keith Brian Assante
(74) *Attorney, Agent, or Firm* — S.J. Intellectual Property LTD.

(57) ABSTRACT

A cooking device and an oil guiding structure includes an oil guiding pipe, a cover and an oil collecting barrel. A first snap-fit part is provided at a bottom of the cover, a second snap-fit part is provided at an outer peripheral of the oil collecting barrel. When the oil collecting barrel is coaxially rotated to a first angle relative to the cover, the first snap-fit part is locked with the second snap-fit part. When the oil collecting barrel is coaxially rotated to a second angle relative to the cover, the first snap-fit part is unlocked with the second snap-fit part. The cooking device includes the above oil guiding structure.

20 Claims, 12 Drawing Sheets

OIL GUIDING STRUCTURE AND COOKING DEVICE

TECHNICAL FIELD

The present disclosure relates to the technical fields of cooking devices, and in particular, to an oil guiding structure and a cooking device.

BACKGROUND

People often choose outdoor activities to relax during their free time, among which barbecuing is a popular choice. Whether in their backyard or while camping, they bring cooking devices to enjoy leisure time with friends.

These cooking devices typically use charcoal or electricity to heat food. During use, meat produces a lot of oil, which accumulates at the bottom of the oven in the cooking device. To facilitate oil drainage and make cleaning easier, an oil outlet in communication with a suitable oil collection container is usually set at the bottom of the cooking device.

SUMMARY

A first aspect of the present disclosure is an oil guiding structure, including: an oil guiding pipe including a first end and a second end, the first end defined with an oil inlet, and the second end defined with an oil outlet; a cover including a first surface, a second surface, and a first opening; the first opening running through the first surface and the second surface; and the second surface provided with a first snap-fit part; and an oil collecting barrel having a first accommodating space inside and defining a second opening; a side of the oil collecting barrel provided with a second snap-fit part; the second end of the oil guiding pipe passing through the first opening and connected to the cover to allow the first opening to be in communication with the oil outlet; the first accommodating space being in communication with the first opening through the second opening; and the second snap-fit part being rotatably connected with the first snap-fit part to allow the oil collecting barrel and the cover to be detachably assembled. The first snap-fit part is locked with the second snap-fit part in response to the oil collecting barrel being coaxially rotated to a first angle relative to the cover; and the first snap-fit part is unlocked with the second snap-fit part in response to the oil collecting barrel being coaxially rotated to a second angle relative to the cover.

A second aspect of the present disclosure provides an oil guiding structure, including: an oil guiding pipe including a first end and a second end, the first end defined with an oil inlet, and the second end defined with an oil outlet; a cover including: a first surface, a second surface, and a first opening; the first opening running through the first surface and the second surface; and the second surface provided with a first snap-fit part; and an oil collecting barrel having a first accommodating space inside and defining a second opening; the oil collecting barrel provided with a second snap-fit part; the second end of the oil guiding pipe passing through the first opening and connected to the cover to allow the first opening to be in communication with the oil outlet; the first accommodating space being in communication with the first opening through the second opening; and the second snap-fit part being rotatably connected with the first snap-fit part. A size of the oil guiding pipe matches a size of the first opening to allow the oil guiding pipe to pass through the first opening.

A third aspect of the present disclosure provides a cooking device. The cooking device includes: a body having an oil draining port and an oil guiding structure. The oil guiding structure includes: an oil guiding pipe including a first end and a second end, the first end defined with an oil inlet, and the second end defined with an oil outlet; a cover including: a first surface, a second surface, and a first opening; the first opening running through the first surface and the second surface; and the second surface provided with a first snap-fit part; and an oil collecting barrel having a first accommodating space inside and defining a second opening; a side of the oil collecting barrel provided with a second snap-fit part; the second end of the oil guiding pipe passing through the first opening and connected to the cover to allow the first opening to be in communication with the oil outlet; the first accommodating space being in communication with the first opening through the second opening; and the second snap-fit part being rotatably connected with the first snap-fit part to allow the oil collecting barrel and the cover to be detachably assembled. The first snap-fit part is locked with the second snap-fit part in response to the oil collecting barrel being coaxially rotated to a first angle relative to the cover; the first snap-fit part is unlocked with the second snap-fit part in response to the oil collecting barrel being coaxially rotated to a second angle relative to the cover; the oil guiding structure is detachably assembled with the body to allow the oil draining port to be in communication with the oil inlet.

BRIEF DESCRIPTION OF THE DRAWINGS

The drawings constituting a part of the present disclosure are configured to provide a further understanding of the present disclosure. The embodiments of the present disclosure and their descriptions are used for explaining and do not constitute an improper limitation on the present disclosure.

DETAILED WAY

Figure 1:
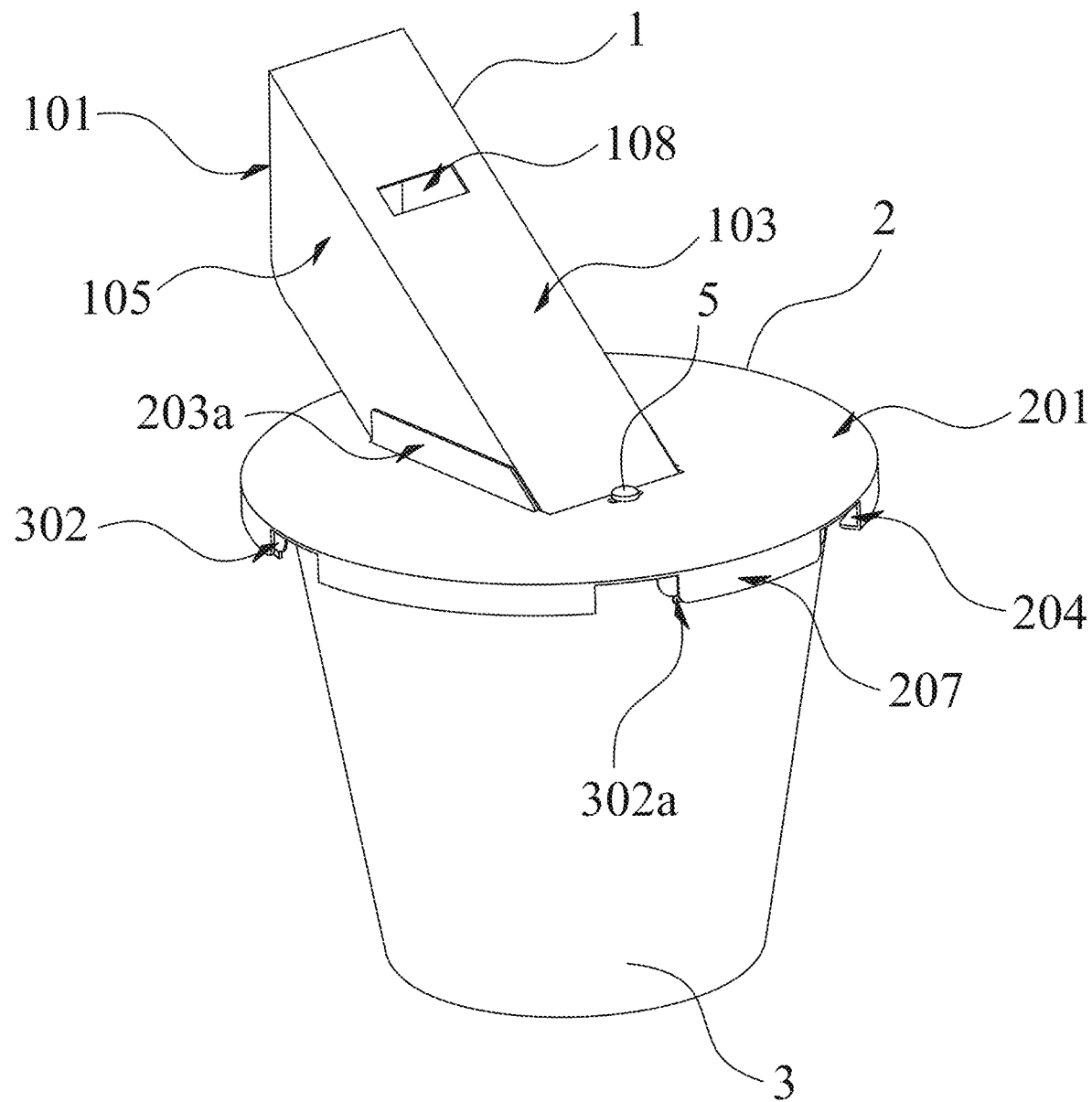
FIG. 1 is an axonometric perspective view of an oil guiding structure in accordance with the embodiments of the present disclosure.
Figure 2:
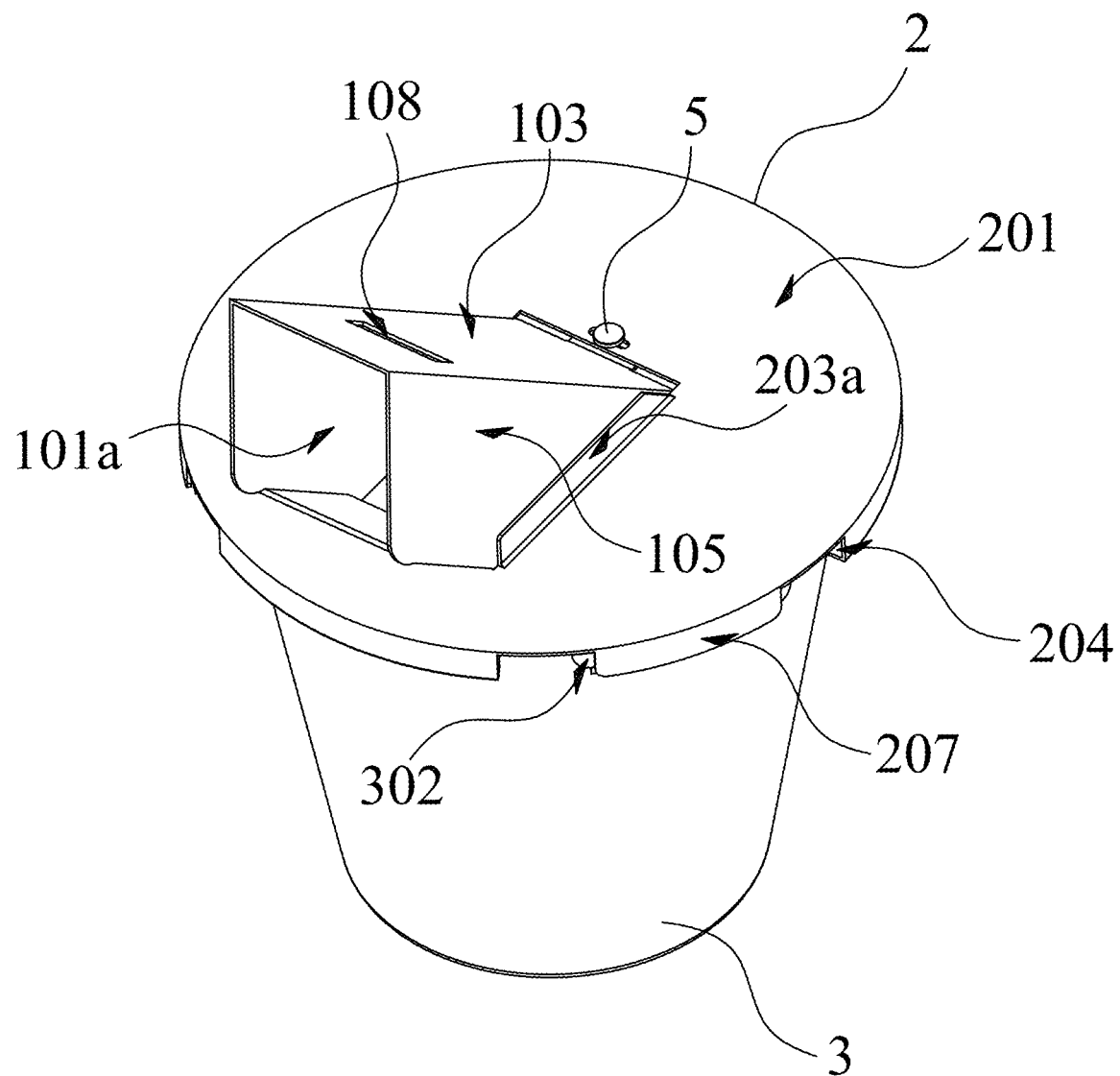
FIG. 2 is another axonometric perspective view of an oil guiding structure in accordance with the embodiments of the present disclosure.

The present disclosure may be described in detail below with reference to the accompanying drawings and in conjunction with various embodiments. Each example is provided to explain but not limit the present disclosure. In fact, it may be clear to those of ordinary skill that modifications and variations may be made without departing from the scope or spirit of the present disclosure. For example, a feature shown or described as part of some embodiments may be used according to another embodiment to produce yet another embodiment. Therefore, it is intended that the present disclosure includes such modifications and variations within the scope of the appended claims and their equivalents.

In the description of the present disclosure, the terms "longitudinal", "lateral", "upper", "lower", "front", "back", "left", "right", "vertical", "horizontal", "top", "bottom" and the like indicate the orientational or positional relationship based on the orientational or positional relationship illustrated in the drawings, which is only for the convenience of describing and does not require the present disclosure to be constructed and operated in a specific orientation, and therefore cannot be understood as limiting the present disclosure. The terms "connected", "connecting" and "arranged" used in the present disclosure should be understood in a broad sense. For example, it may be a fixed connection or a detachable connection; it may be directly connected or indirectly connected through an intermediate component; it may also be a wired electrical junction, a radio connection, or a wireless signal connection. For those of ordinary skill in the art, the specific meanings of the above terms may be understood according to the specific circumstances.

One or more examples of the present disclosure are illustrated in the attached drawings. Numbers and letter signs are used in the detailed description to refer to features in the drawings. Similar signs in the drawings and descriptions have been configured to refer to similar parts of the present disclosure. As used herein, the terms "first", "second" and "third" are used interchangeably to distinguish one component from another and are not intended to indicate the position or importance of individual components.

Oil collection containers often have one or more of the following issues. The connection between the oil container and the cooking device's oil outlet is not tight, leading to oil splattering outside the container during drainage. The connection structure and installation method between the oil container and the cooking device's outlet are not well-designed, making the container difficult to replace and posing safety risks; the internal structure of the oil container has hard-to-clean areas, complicating subsequent cleaning.

Therefore, designing a well-structured oil drainage system for cooking devices that ensures safer, more convenient, and efficient oil removal is a pressing technical challenge.

As illustrated in FIG. 1 to FIG. 9, the embodiments of the present disclosure propose an oil guiding structure, which includes an oil guiding pipe 1, a cover 2 and an oil collecting barrel 3.

In some embodiments, the oil guiding pipe 1 has an oil inlet 101a and an oil outlet 102a. The oil inlet 101a may be connected to an oil discharge structure of a cooking device to ensure that the oil generated by the cooking device flows into the oil guiding pipe 1 through the oil inlet 101a.

In some embodiments, the oil guiding pipe 1 is a cuboid tube. An extension direction of the rectangular tube forms an angle with an extension direction of the cover 2. This ensures that the oil flows smoothly in the oil guiding pipe 1, reduces the accumulation of oil in the oil guiding pipe 1, and facilitates subsequent cleaning.

In some embodiments, the cover 2 is disc-shaped and has a rectangular slot-shaped first opening 203. An end, which defines the oil outlet 102a, of the oil guiding pipe 1 is detachably assembled with the cover 2. The first opening 203 is in communication with the oil outlet 102a of the oil guiding pipe 1, a size of the first opening 203 matches a size of an outer wall of the rectangular tubular oil guiding pipe 1. Therefore, the oil outlet 102a of the oil guiding pipe 1 may pass through the first opening 203. When installing the oil guiding pipe 1 to the cover 2; one side, arranged with a first connecting plate 106, of the second end 102 is first inserted into the first opening 203 of a first surface 201 of the cover 2; another side, arranged with the second connecting plate 107, of a second end 102 of the oil guiding pipe 1 is then inserted into the first opening 203 of the first surface 201 of the cover 2. After the first connecting plate 106 and the second connecting plate 107 pass through the first opening 203 respectively, the oil guiding pipe 1 is pulled upward until the first connecting plate 106 and the second connecting plate 107 respectively abut against the second surface 202 of the cover 2. This ensures that the oil outlet 102a and the cover 2 are installed in place before subsequent fixing, and the oil outlet 102a of the oil guiding pipe 1 is in communication with the inside of the oil collecting barrel 3.

Figure 7:
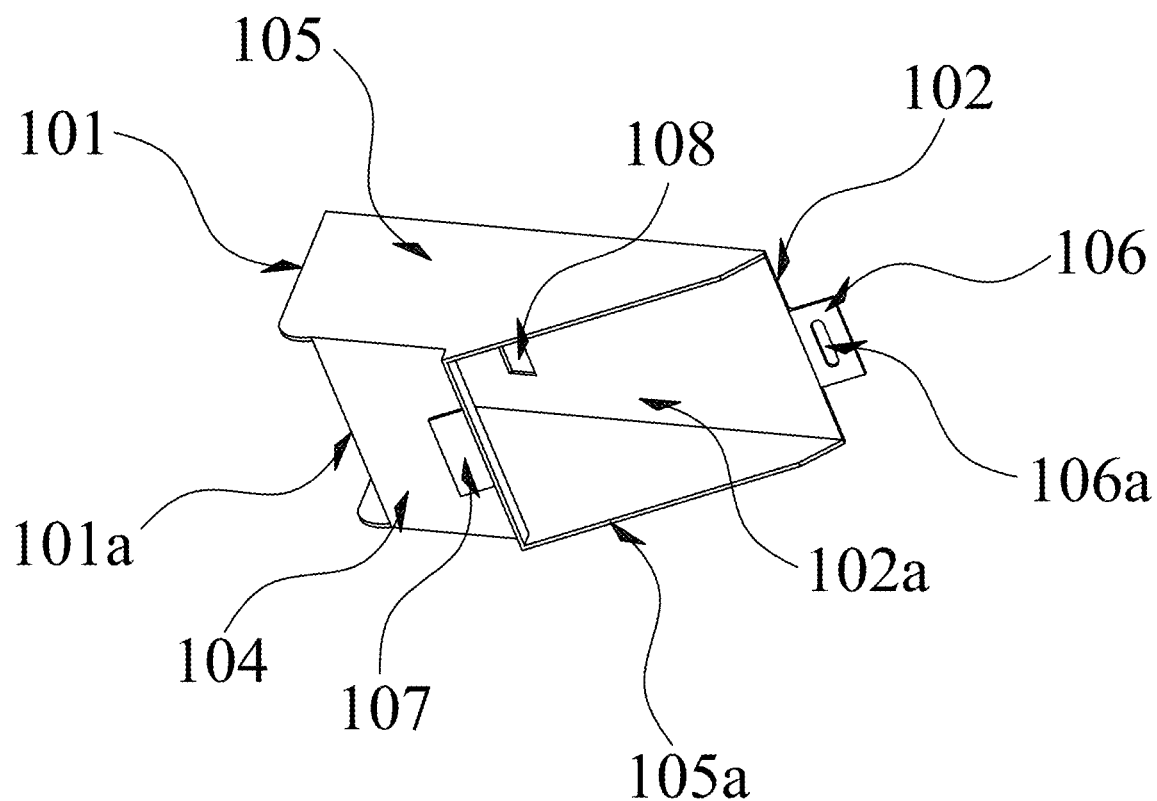
FIG. 7 is a perspective view of an oil guiding pipe of an oil guiding structure in accordance with the embodiments of the present disclosure.
Figure 8:
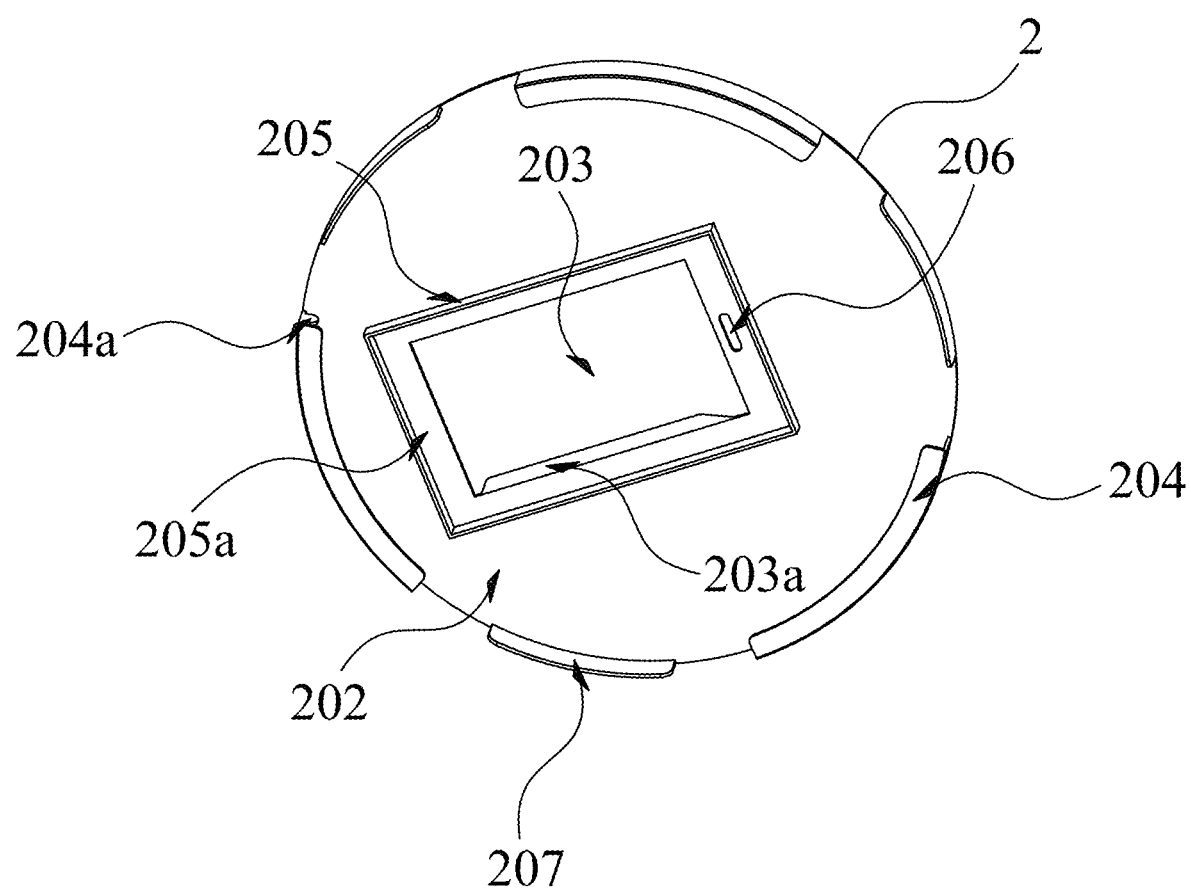
FIG. 8 is a perspective view of a cover of an oil guiding structure in accordance with the embodiments of the present disclosure.
Figure 9:
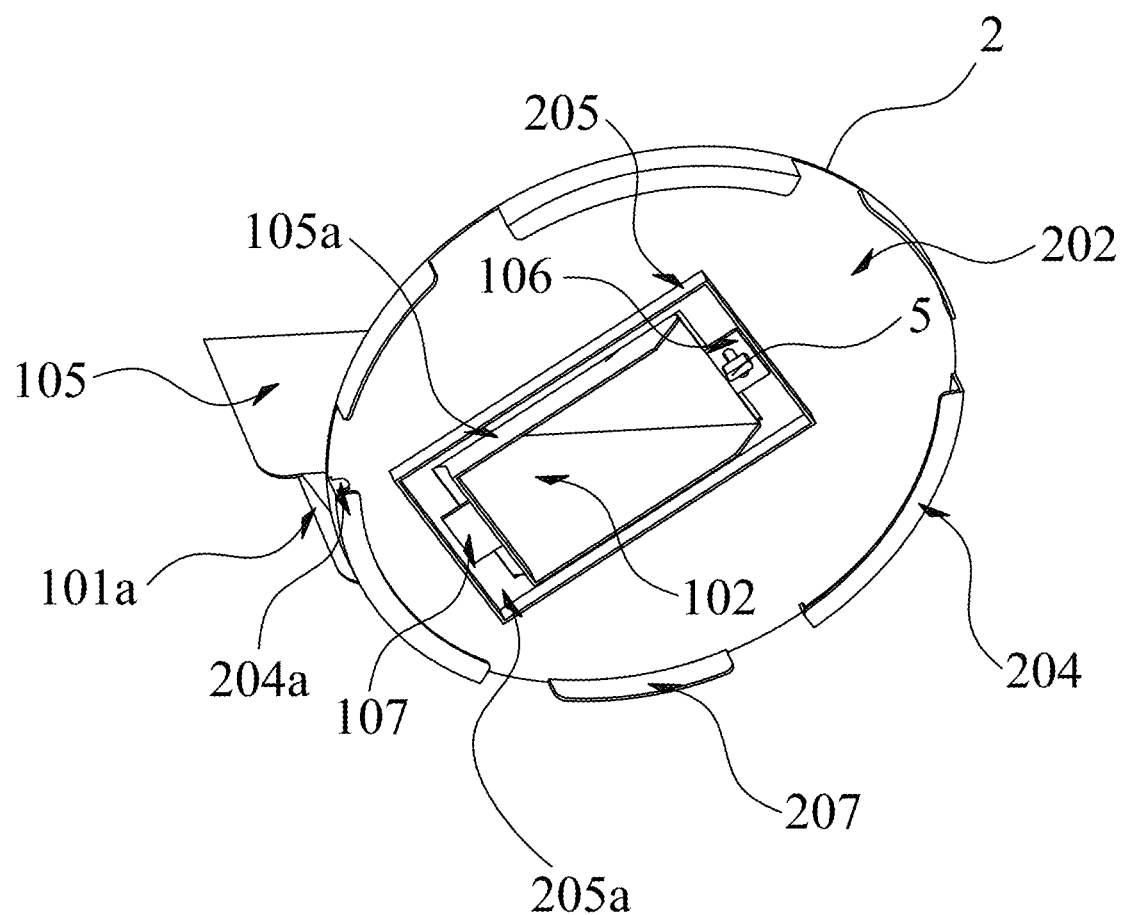
FIG. 9 is a perspective view of an oil guiding pipe and a cover separated with each other in accordance with the embodiments of the present disclosure.

In some embodiments, as illustrated in FIG. 7 to FIG. 9, an edge of the oil outlet 102a of the oil guiding pipe 1 is provided with a first connecting plate 106, which is located at a position near an upper surface 103; and the edge of the oil outlet 102a of the oil guiding pipe 1 is provided with a second connecting plate 107, which is located at a position near a lower surface 104. After the first connecting plate 106 and the second connecting plate 107 both pass through the cover 2 through the first opening 203, the oil guiding pipe 1 is pulled in an opposing direction of the passing direction. This allows the oil guiding pipe 1 to move relative to the cover 2 until the first connecting plate 106 and the second connecting plate 107 both abut against the bottom of the cover 2.

In some embodiments, the oil guiding structure further includes a locking member 5, which passes through the cover 2 and is connected to the first connecting plate 106 and allows the oil guiding pipe 1 to be detachably mounted on the cover 2. The oil guiding pipe 1 and the cover 2 thus arranged are not only simple to disassemble and assemble, facilitating to maintenance and cleaning of the cover 2, but also more convenient for packaging and transportation.

Figure 3:
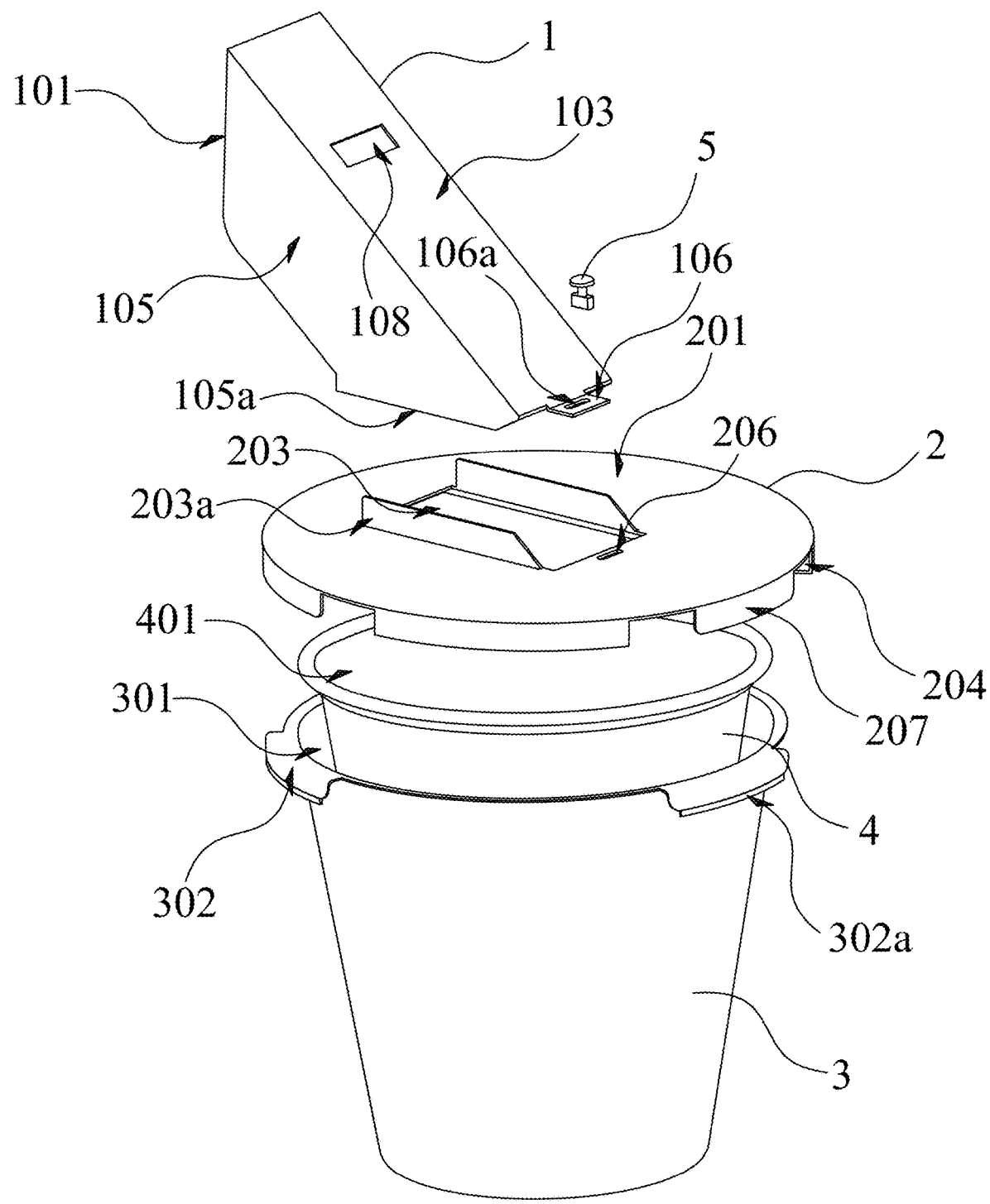
FIG. 3 is an exploded view of an oil guiding structure in accordance with the embodiments of the present disclosure.

In some embodiments, as illustrated in FIG. 3, a locking member 5 may be a rotating clip, and the first mounting hole 106a and the second mounting hole 206 are waist-shaped holes extending in directions parallel to each other. An outer dimension of one end of the rotating clip matches with the first mounting hole 106a and the second mounting hole 206. When the oil guiding pipe 1 and the cover 2 are installed, the end of the rotating clip passes through the first mounting hole 106a and the second mounting hole 206 in advance. After the oil guiding pipe 1 passes through the cover 2 through the first opening 203, the first connecting plate 106 which faces the upper surface 104 and the second connecting plate 107 which faces the lower surface 104 of the oil guiding pipe 1 respectively abut against the bottom of the cover 2. Then, by rotating the rotating clip, the fixation between the oil guiding pipe 1 and the cover 2 is achieved.

Figure 4:
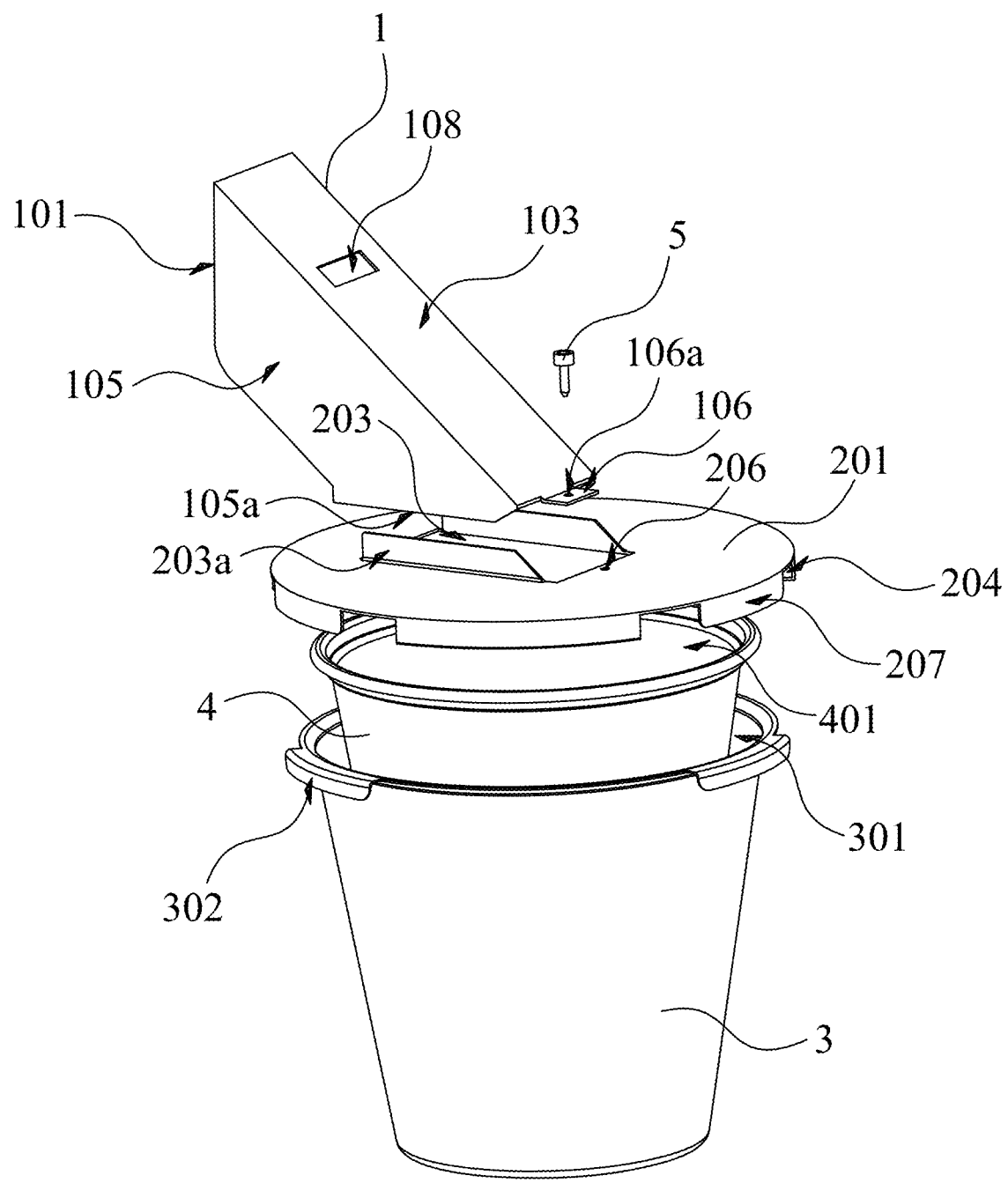
FIG. 4 is another exploded view of an oil guiding structure in accordance with the embodiments of the present disclosure.

In some embodiments, as illustrated in FIG. 4, the locking member 5 may be a threaded connector or a threaded connecting assembly, i.e., a screw or a screw-nut assembly. The first mounting hole 106a is a through hole, and the second mounting hole 206 is a threaded hole corresponding to the screw or a through hole corresponding to the screw-nut assembly, respectively. After the oil guiding pipe 1 passes through the cover 2 through the first opening 203, the relative fixation between the oil guiding pipe 1 and the cover 2 may be achieved through threaded connection.

In some embodiments, as illustrated in FIG. 1 to FIG. 4, a top of the cover 2 is provided with two first limiting plates 203a extending from two opposing edges of the first opening 203 in a direction away from the cover 2. The positions of the two first limiting plates 203a correspond to the two opposing side surfaces 105 of the oil guiding pipe 1 respectively. After the oil guiding pipe 1 passes through the cover 2 through the first opening 203, the two first limiting plates 203a fit the two side surfaces 105 of the oil guiding pipe 1 respectively, effectively preventing cover 2 from wobbling during use, thereby reducing or preventing the oil collection barrel 3 from shaking which otherwise causes oil to spill.

In some embodiments, the lengths of the two first limiting plates 203a are each equal to the lengths of two edges of the oil guiding pipe 1. The two edges of the oil guiding pipe 1 intersects with the first opening 203 when tilted. This ensures that the first limiting plates 203a and the oil guiding pipe 1 contact each other sufficiently, enhancing the support and limiting effect of the two first limiting plates 203a on the oil guiding pipe 1. The height of the two first limiting plates 203a is between 9 mm and 11 mm, further ensuring contact area with the oil guiding pipe 1, and improving the stability of the connection between the oil guiding pipe 1 and the cover 2. In some embodiments, the height of the two first limiting plates 203a is 10 mm.

In some embodiments, as illustrated in FIG. 1 to FIG. 4 and FIG. 7 to FIG. 9, the two opposing side surfaces 105 of the oil guiding pipe 1 pass through the first opening 203 of the cover 2 along the extension direction of the oil guiding pipe 1 to form two opposing first oil baffles 105a, which are below the bottom of the cover 2. The lower surface 104 of the outer wall of the oil guiding pipe 1 passes through the first opening 203 and extends a folded edge toward the bottom of the oil collecting barrel 3. The folded edge connects the two first oil baffles 105a to form a semi-annular oil baffle structure. The semi-annular oil baffle structure may prevent oil from splashing from the gap between the oil guiding pipe 1 and the cover 2 when the oil guiding pipe 1 guides oil into the oil collecting barrel 3.

In some embodiments, as illustrated in FIG. 8, a bottom corresponding to the first opening 203 of the cover 2 is provided with a second oil baffle plate 205 with an annular structure. The second oil baffle plate 205 extends from the bottom of the cover 2 toward an inside of the oil collecting barrel 3. The annular structure of the second oil baffle plate 205 matches the size of the first opening 203 of the cover 2. The second oil baffle plate 205 with an annular structure may surround the first opening 203, the first connecting plate 106, the second connecting plate 107 and the first oil baffle plate 105a on the cover 2, further enhancing the oil baffle effect.

In some embodiments, the second oil baffle plate 205 and the cover 2 are an integral structure, which may be formed by injection molding, blow molding, casting, stamping or sheet metal processing.

In some embodiments, the second oil baffle plate 205 and the cover 2 are separated structures. The second oil baffle plate 205 may be installed on the bottom of the cover 2 by sintering, welding or threading. The detachable second oil baffle 205 may be optionally installed on the second surface 202 of the cover 2, depending on the specific usage conditions of the oil guiding structure.

In some embodiments, the oil guiding structure has both the first oil baffle plate 105a and the second oil baffle plate 205.

In some embodiments, as illustrated in FIG. 3 and FIG. 4, the oil collecting barrel 3 is a cylindrical container having a first accommodating space inside and a second opening 301 at the top. The first accommodating space of the oil collecting barrel 3 is in communication with the first opening 203 of the cover 2 through the second opening 301 at the top, allowing the oil in the oil guiding pipe 1 to flow into the first accommodating space through the first opening 203 and the second opening 301 in sequence. Therefore, the collection of oil is achieved.

In some embodiments, as illustrated in FIGS. 3 and 4, the oil guiding structure also includes a liner barrel 4, which is a cylindrical structure having a second accommodating space inside and a third opening 401 at the top. The outer dimensions of the liner barrel 4 match the volume of the first accommodating space of the oil collecting barrel 3. The liner barrel 4 may be disposed in the first accommodating space of the oil collecting barrel 3 through the second opening 301. The third opening 401 of the liner barrel 4 is in communication with the oil outlet 102a of the oil guiding pipe 1 through the first opening 203 of the cover 2. The liner barrel 4 is made of silicone material. Collecting oil into the liner barrel 4 effectively reduces the difficulty of later cleaning and maintenance. The liner barrel 4 made of silicone material is resistant to high temperature and easy to clean, has high reusability, and environmentally friendly.

In some embodiments, as illustrated in FIG. 1 to FIG. 6 and FIG. 8, the bottom of the cover 2 is arranged with a plurality of first snap-fit parts 204. The plurality of first snap-fit parts 204 are evenly distributed along a circumferential edge of the cover 2. Each first snap-fit part 204 extends in an arc along the circumferential edge of the cover 2. An outer circumferential side of the top of the cylindrical oil collecting barrel 3 is provided with a plurality of second snap-fit parts 302 corresponding to the plurality of first snap-fit parts 204 on the cover 2. When the oil collecting barrel 3 rotates coaxially relative to the cover 2 to a first angle, the plurality of second snap-fit parts 302 are engaged with the plurality of first snap-fit parts 204 correspondingly. When the oil collecting barrel 3 rotates coaxially relative to the cover 2 to a second angle, the plurality of second snap-fit parts 302 are disengaged from the plurality of first snap-fit parts 204 correspondingly.

Figure 5:
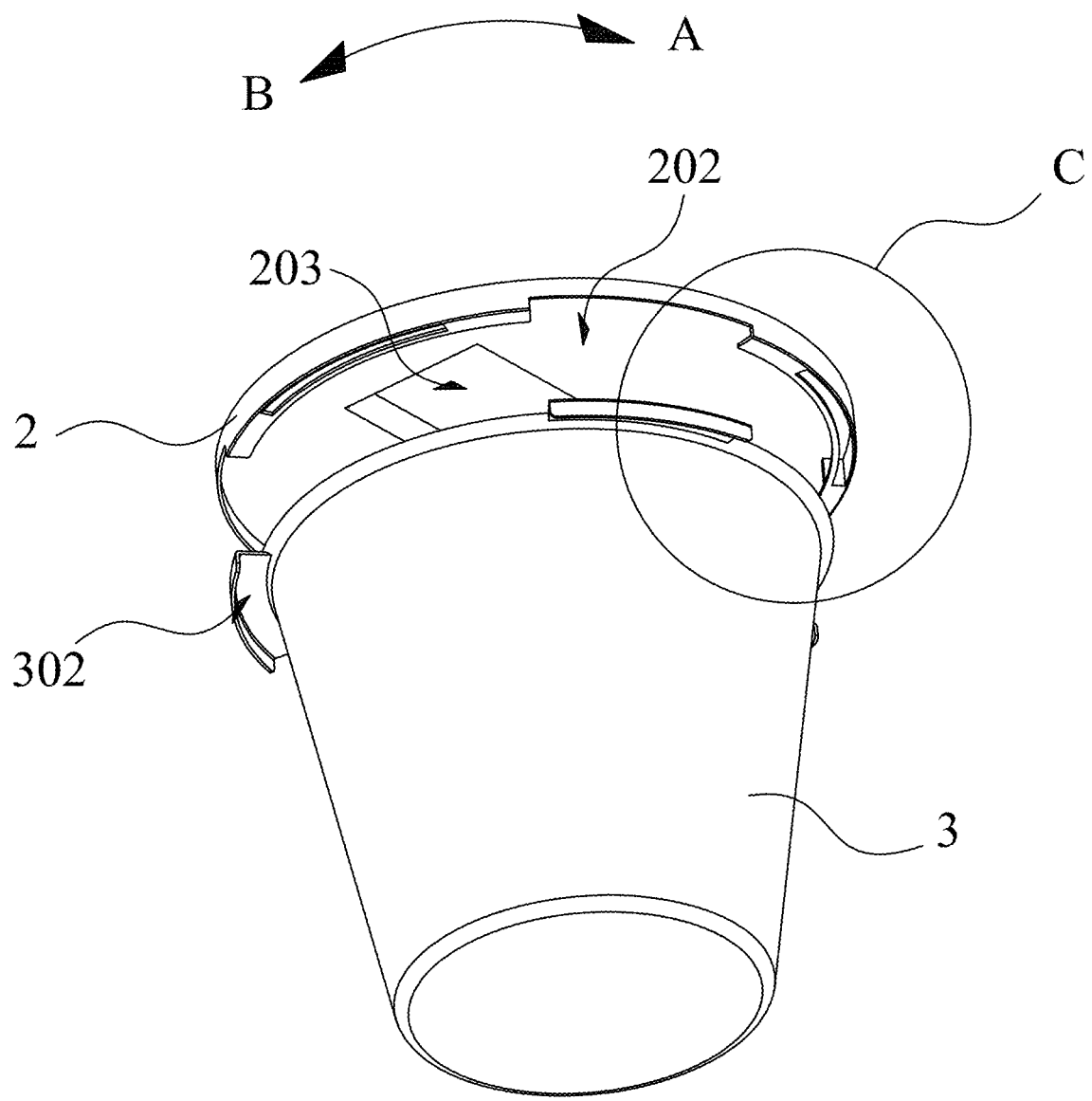
FIG. 5 is a perspective view of a cover and an oil collection barrel separated with each other in accordance with the embodiments of the present disclosure.

In some embodiments, as illustrated in FIG. 5, the quantity of the first snap-fit parts 204 on the cover 2 and the quantity of the second snap-fit parts 302 on the oil collecting barrel 3 are three respectively. The relative position of the cover 2 and the oil collecting barrel 3 in FIG. 5 is taken as the initial position, and the preset rotation angles include the first angle and the second angle. When the oil collecting barrel 3 rotates coaxially relative to the cover 2 along the first direction A to the first angle, each second snap-fit part 302 rotates and couples with its corresponding first snap-fit part 204, and the oil collecting barrel 3 and the cover 2 are fixed. When the oil collecting barrel 3 rotates coaxially relative to the cover 2 along the second direction B to the second angle, each second snap-fit part 302 rotates and decouples from its corresponding first snap-fit part 204, and the oil collecting barrel 3 is detached from the cover 2.

Figure 6:
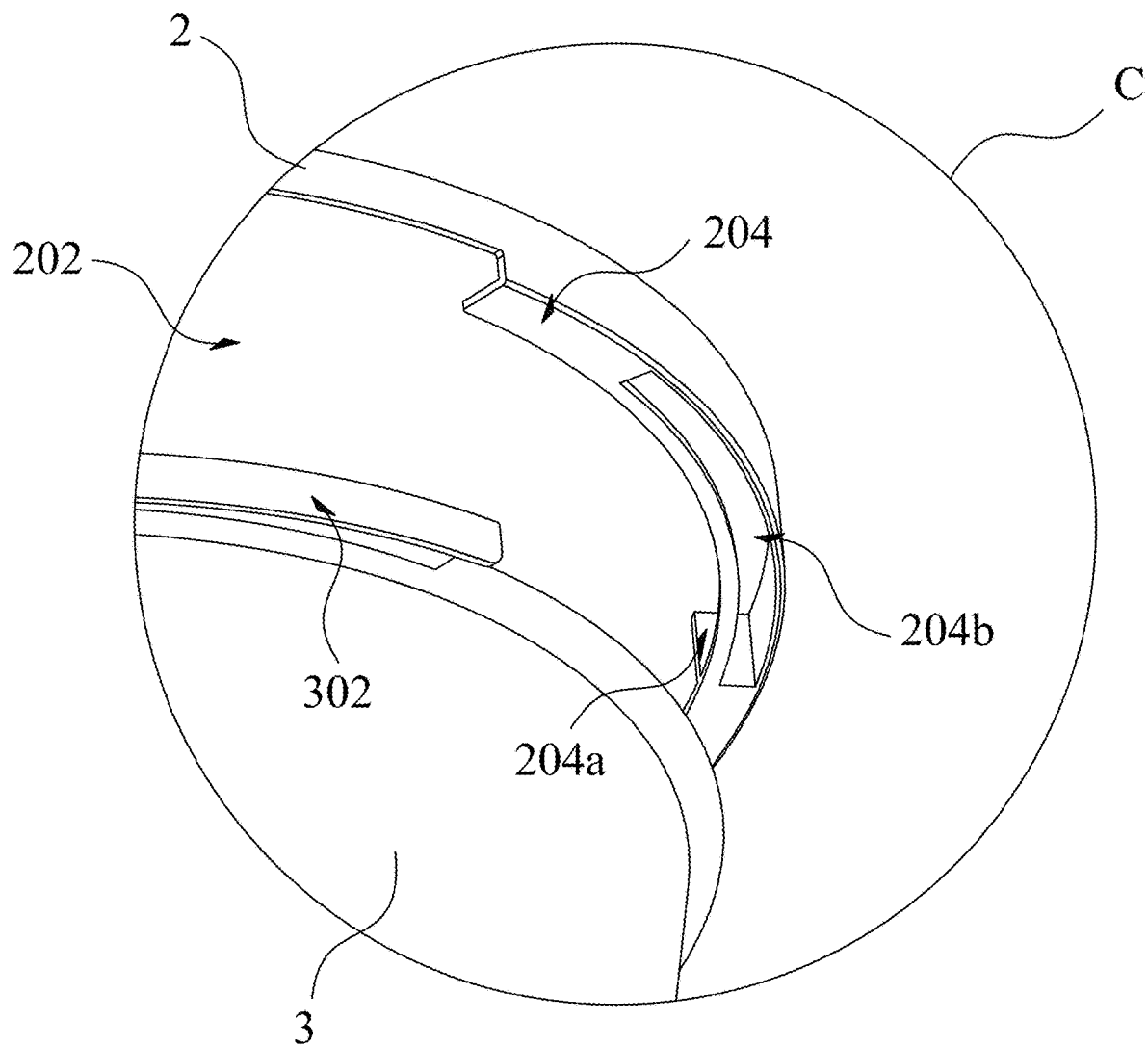
FIG. 6 is a partial enlarged view of area C in FIG. 5.

In some embodiments, as illustrated in FIG. 5 and FIG. 6, each first snap-fit part 204 of the cover 2 is provided with a second limiting plate 204a. When the plurality of second snap-fit parts 302 on the oil collecting barrel 3 slide to the preset position to the corresponding first snap-fit parts 204, the second limiting plate 204a of each first snap-fit part 204 abuts against an end of a corresponding second snap-fit part 302. This ensures that the oil collecting barrel 3 accurately rotates and stops at the preset angle, preventing the oil collecting barrel 3 to be unstable when connected with the cover 2 due to the excessive rotation angle of the oil collecting barrel 3.

In some embodiments, as illustrated in FIG. 5 and FIG. 6, each first snap-fit part 204 on the cover 2 is defined with a limiting groove 204b extending in a same direction as that of the bottom, and a size of the limiting groove 204b matches an outer size of a corresponding second snap-fit part 302. When the plurality of second snap-fit parts 302 on the oil collecting barrel 3 slide to the corresponding first snap-fit parts 204, each second snap-fit part 302 slides to abut against a corresponding second limiting plate 204a. Each second snap-fit part 302 of the oil collecting barrel 3 is inserted into the corresponding limiting groove 204b under gravity, limiting the second snap-fit part 302 in the limiting groove 204b, further effectively improving the stability of the connection between the oil collecting barrel 3 and the cover 2.

In some embodiments, as illustrated in FIG. 3 and FIG. 4, a bottom of each second snap-fit part 302 on the oil collecting barrel 3a is provided with a rubber strip 302a. When each second snap-fit part 302 on the oil collecting barrel 3 slides into the limiting groove 204b of the corresponding first snap-fit part 204, the rubber strip 302a is inserted into the gap between the second snap-fit part 302 and a corresponding first snap-fit part 204. Once inserted, the rubber strip 302a not only reduces friction between the oil collecting barrel 3 and the cover 2, thereby minimizing surface wear, but also effectively decreases the installation gap. This helps prevent the safety hazard of fingers accidentally getting caught due to an excessively large gap during installation.

In some embodiments, as illustrated in FIG. 1 to FIG. 4, in order to further improve the ease of the installation between the oil collecting barrel 3 and the cover 2, a guiding plate 207 is provided between any two adjacent first snap-fit parts 204. Each guiding plate 207 extends in an arc along the circumferential edge of the cover 2. A gap between each guiding plate 207 and its adjacent first snap-fit part 204 is smaller than the size of a second snap-fit part 302. When the oil collecting barrel 3 and the cover 2 is installed, each guiding plate 207 may be pre-aligned with the second snap-fit part 302 on the oil collecting barrel 3, and then the cover 2 and the oil collecting barrel 3 are pressed and the two are coaxially rotated in a preset direction. With the guiding plate 207, the second snap-fit part 302 on the oil collecting barrel 3 may more easily slide into its corresponding first snap-fit part 204. The gap between the guiding plate 207 and its corresponding first snap-fit part 204 is smaller than the size of the second snap-fit part 302, ensuring that the second snap-fit part 302 not slide out of the gap between the guiding plate 207 and the first snap-fit part 204 when rotating along the guiding plate 207.

Figure 10:
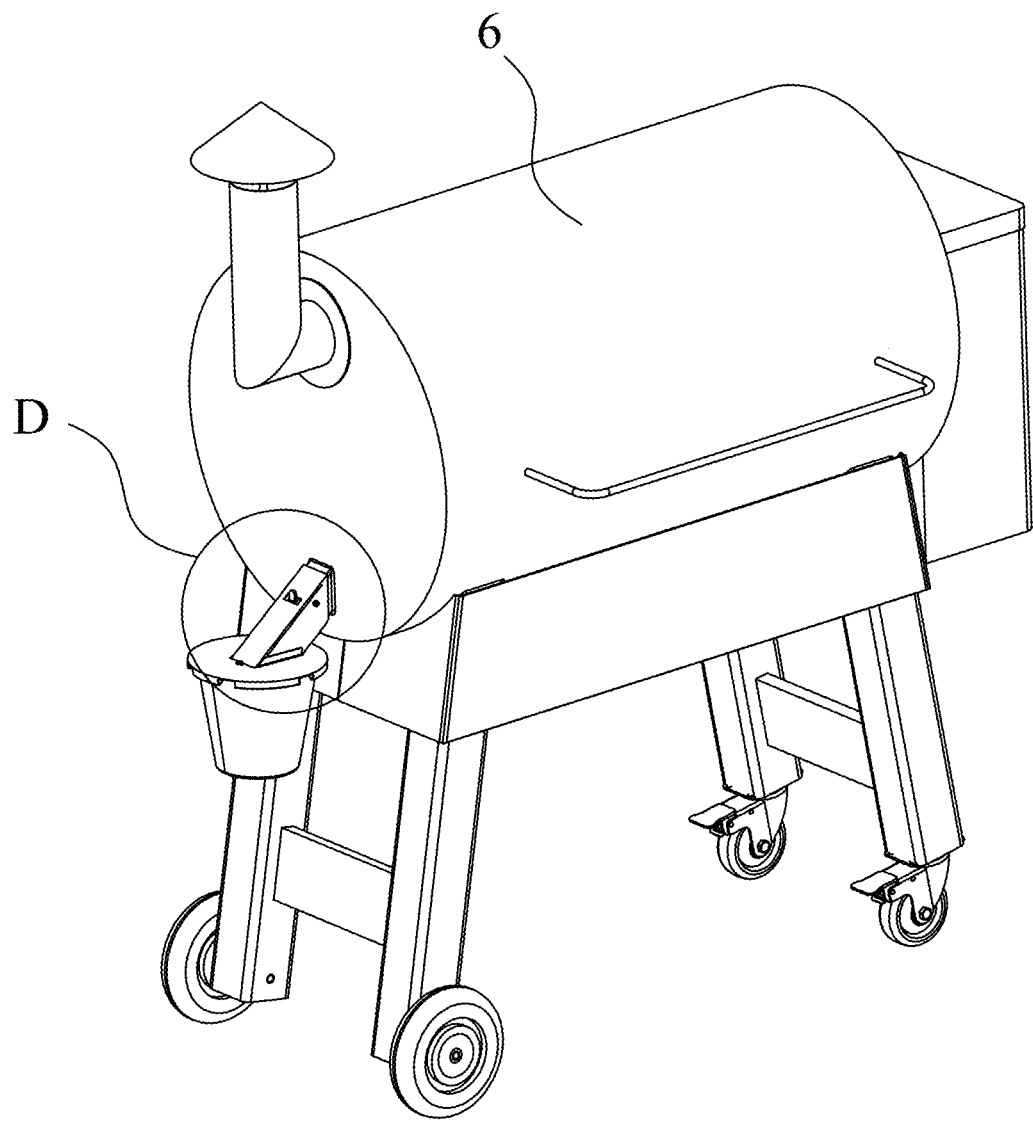
FIG. 10 is a perspective view of a cooking device in accordance with the embodiments of the present disclosure.
Figure 11:
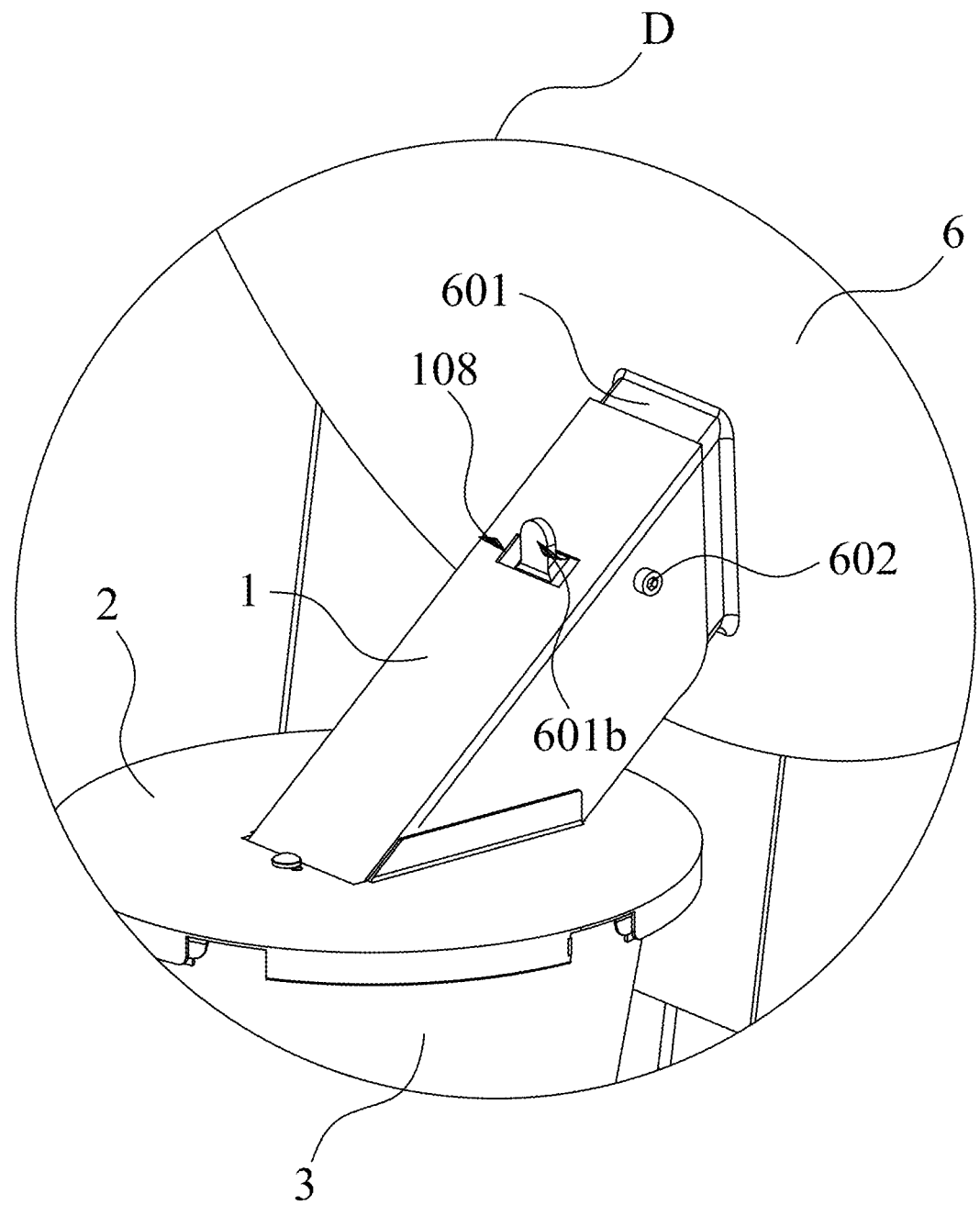
FIG. 11 is a partial enlarged view of area D in FIG. 10.
Figure 12:
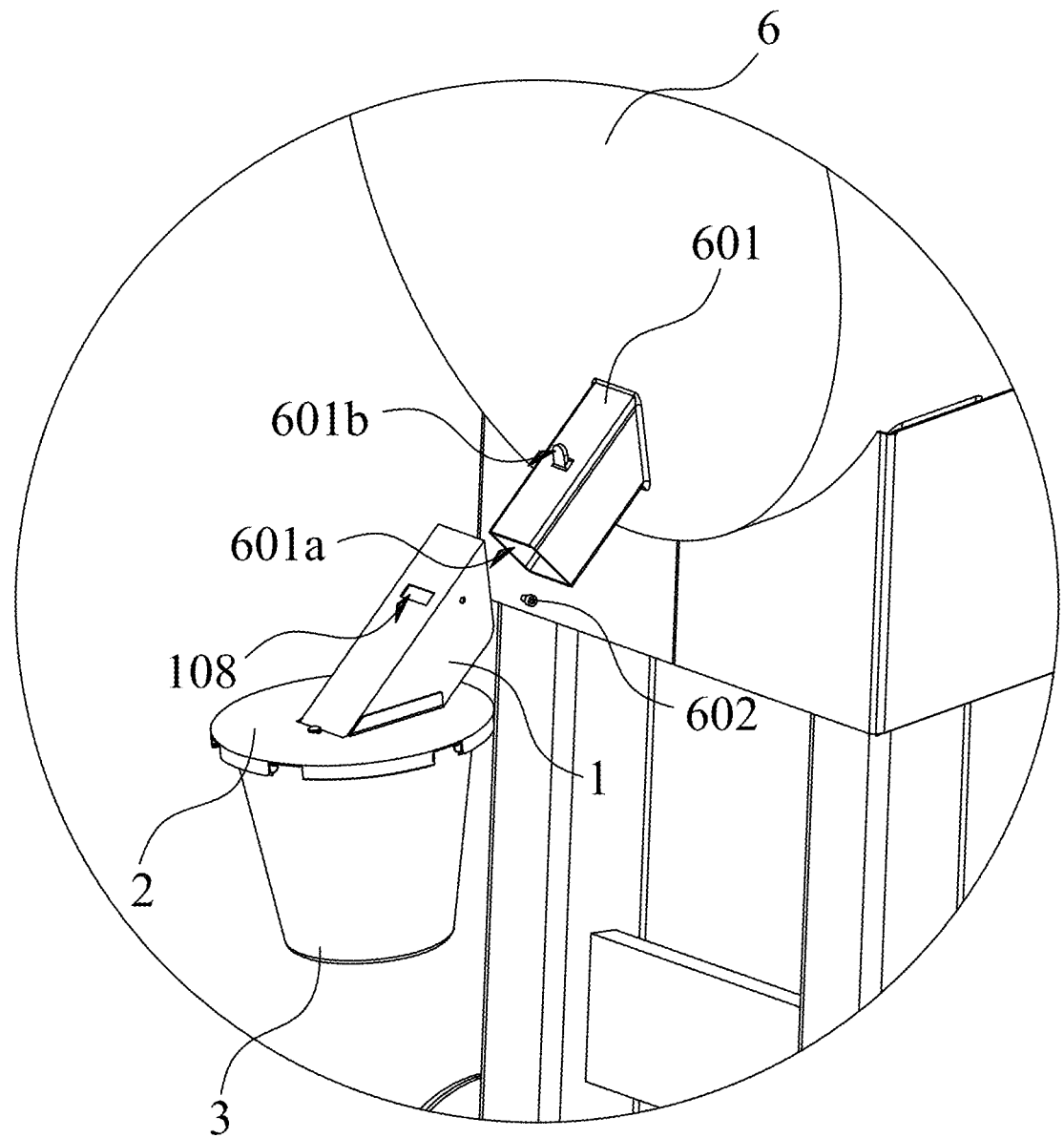
FIG. 12 is a partial, exploded view of a cooking device in accordance with the embodiments of the present disclosure.

As illustrated in FIG. 10 to FIG. 12, the embodiments of the second aspect of the present disclosure propose a cooking device, including a body and an oil guiding structure. The body has an oil draining port 601a. The oil guiding structure is detachably assembled with the body, and the oil draining port 601a is in communication with the oil inlet 101a of the oil guiding pipe 1, allowing the oily liquid generated by the body to flow smoothly into the oil collecting barrel 3 through the oil guiding pipe 1 and the cover 2.

In some embodiments, as illustrated in FIG. 10 to FIG. 12, an oil draining pipe 601 is provided on the body 6, and the oil draining pipe 601 protrudes from an outer side wall of the body 6. The oil draining port 601a is provided on a surface of the oil draining pipe 601 on a side facing the oil guiding structure.

In some embodiments, a connection part 601b is provided on the oil draining pipe 601, and the oil guiding pipe 1 is defined with a connection groove 108. The connection part 601b is inserted into the connection groove 108, allowing the oil guiding pipe 1 to be sleeved on the oil draining pipe 601. This ensures that the oil draining port 601a of the oil draining pipe 601 is in communication with the oil inlet 101a of the oil guiding pipe 1, the oil generated by the body 6 may flow into the oil guiding pipe 1 through the oil inlet 101a. After the oil guiding pipe 1 is sleeved with the oil draining pipe 601, it may be fixed by tightening a screw 602 to ensure a stable connection.

From the above description, it may be seen that the above-mentioned embodiments of the present disclosure achieve the following technical effects:

Compared with the related art, in the present disclosure, the angle formed between the oil guiding pipe 1 and the cover 2 ensures that the oil flows smoothly into the oil collecting barrel 3. The rotating snap-fitting between the second snap-fit parts 302 of the oil collecting barrel 3 and the first snap-fit parts 204 of the cover 2 may effectively reduce the difficulty of disassembling and assembling the oil collecting barrel 3. Additionally, the connection structure and installation manner between the cover 2 and the oil collecting barrel 3 are reasonable, effectively preventing rainwater or debris from entering the oil collecting barrel 3 and preventing children or animals from accidentally touching or eating waste oil. The first oil baffle 105a at the oil outlet 102a of the oil guiding pipe 1 and the second oil baffle 205 at the bottom of the cover 2 effectively prevents oil from splashing during the flow process. The limiting groove 204b defined by the first snap-fit part 204 and the rubber strip 302a at the bottom of the second snap-fit part 302 effectively minimizes the gap between the oil collecting barrel 3 and the cover 2 after installation. This not only reduce the friction between the cover 2 and the oil collecting barrel 3, but also helps prevent the safety hazard of fingers accidentally getting caught due to an excessively large gap during installation.

The above description is only some embodiments of the present disclosure and is not intended to limit the scope of the present disclosure. Any equivalent changes or modifications made according to the structure, characteristics and principles described in the protection scope of the present disclosure should be included in the protection scope of the present disclosure.

What is claimed is:

1. An oil guiding structure, comprising:
   an oil guiding pipe comprising a first end and a second end, the first end defined with an oil inlet, and the second end defined with an oil outlet;
   a cover comprising: a first surface, a second surface, and a first opening; the first opening running through the first surface and the second surface; and the second surface provided with a first snap-fit part; and
   an oil collecting barrel having a first accommodating space inside and defining a second opening; a side of the oil collecting barrel provided with a second snap-fit part; the second end of the oil guiding pipe passing through the first opening and connected to the cover to allow the first opening to be in communication with the oil outlet; the first accommodating space being in communication with the first opening through the second opening; and the second snap-fit part being rotatably connected with the first snap-fit part to allow the oil collecting barrel and the cover to be detachably assembled;

wherein the first snap-fit part is locked with the second snap-fit part in response to the oil collecting barrel being coaxially rotated to a first angle relative to the cover; and the first snap-fit part is unlocked with the second snap-fit part in response to the oil collecting barrel being coaxially rotated to a second angle relative to the cover.

2. The oil guiding structure according to claim 1, wherein an extension direction of the oil guiding pipe forms an angle with an extension direction of the first surface; the oil guiding pipe has an upper surface, a lower surface and two opposing side surfaces; a size of the oil guiding pipe matches a size of the first opening to allow the oil guiding pipe to pass through the first opening; the upper surface is provided with a first connecting plate proximal to the oil outlet; the lower surface is provided with a second connecting plate proximal to the oil outlet; and the first connecting plate and the second connecting plate abut against the second surface in response to the oil outlet being in communication with the first opening.

3. The oil guiding structure according to claim 2, wherein each of the two opposing side surfaces is provided with a first limiting plate proximal to the first opening; and each first limiting plate extends toward the first end of the oil guiding pipe.

4. The oil guiding structure according to claim 3, wherein each of the two opposing side surfaces comprises a first oil baffle passing through the first opening and extending toward the first accommodating space along the extension direction of the oil guiding pipe.

5. The oil guiding structure according to claim 4, wherein a peripheral of the first opening of the second surface is provided with a second oil baffle extending toward the first accommodating space; the second oil baffle is arranged to surround an annular area; and the first opening, the first connecting plate and the second connecting plate are located within the annular area.

6. The oil guiding structure according to claim 5, wherein the second oil baffle is detachably connected to the second surface.

7. The oil guiding structure according to claim 2, wherein the first connecting plate is defined with a first mounting hole, the cover is defined with a second mounting hole corresponding to the first connecting hole, and a locking member is provided to detachably connect the first connecting plate to the cover through the first mounting hole and the second mounting hole.

8. The oil guiding structure according to claim 1, wherein a second limiting plate is provided on the first snap-fit part; and the second snap-fit part abuts against the second limiting plate in response to the oil collecting barrel being coaxially rotated to the first angle relative to the cover.

9. The oil guiding structure according to claim 8, wherein a bottom of the first snap-fit part is defined with a limiting groove; a dimension of the limiting groove matches a dimension of the second snap-fit part; and the second snap-fit part is assembled into the limiting groove under gravity in response to the oil collecting barrel being coaxially rotated to the first angle relative to the cover.

10. The oil guiding structure according to claim 9, wherein a bottom of the second snap-fit part is provided with a rubber strip; and the rubber strip is inserted into the limiting groove in response to the oil collecting barrel being coaxially rotated to the first angle relative to the cover.

11. The oil guiding structure according to claim 1, wherein the cover is disc-shaped, a peripheral of the second surface is evenly provided with a plurality of the first snap-fit parts; the oil collecting barrel is cylindrical; an outer peripheral of the oil collecting barrel is evenly provided with a plurality of the second snap-fit parts corresponding to the plurality of the first snap-fit parts; a guiding plate is provided between any two adjacent first snap-fit parts and extends along the peripheral of the cover, and a gap between one guiding plate and an adjacent first snap-fit part is not greater than a size of one second snap-fit part.

12. The oil guiding structure according to claim 1, further comprising a liner barrel, wherein the liner barrel is made of silicone and detachably installed in the first accommodating space, the liner barrel is cylindrical and has a cylindrical second accommodating space inside, a top of the liner barrel has a third opening, and the second accommodating space is in communication with the first opening through the third opening.

13. An oil guiding structure, comprising:
an oil guiding pipe comprising a first end and a second end, the first end defined with an oil inlet, and the second end defined with an oil outlet;
a cover comprising: a first surface, a second surface, and a first opening; the first opening running through the first surface and the second surface; and the second surface provided with a first snap-fit part; and
an oil collecting barrel having a first accommodating space inside and defining a second opening; the oil collecting barrel provided with a second snap-fit part; the second end of the oil guiding pipe passing through the first opening and connected to the cover to allow the first opening to be in communication with the oil outlet; the first accommodating space being in communication with the first opening through the second opening; and the second snap-fit part being rotatably connected with the first snap-fit part;
wherein a size of the oil guiding pipe matches a size of the first opening to allow the oil guiding pipe to pass through the first opening.

14. The oil guiding structure according to claim 13, wherein the oil guiding pipe has an upper surface, a lower surface and two opposing side surfaces; the upper surface is provided with a first connecting plate; the lower surface is provided with a second connecting plate; and the first connecting plate and the second connecting plate abut against the second surface in response to the oil outlet being in communication with the first opening.

15. The oil guiding structure according to claim 14, wherein each of the two opposing side surfaces is provided with a first limiting plate; and each first limiting plate extends toward the first end of the oil guiding pipe.

16. The oil guiding structure according to claim 15, wherein each of the two opposing side surfaces comprises a first oil baffle, and the first oil baffle of each of the two opposing side surfaces passes through the first opening and extends toward the first accommodating space.

17. The oil guiding structure according to claim 16, wherein a peripheral of the first opening of the second surface is provided with a second oil baffle extending toward the first accommodating space.

18. The oil guiding structure according to claim 14, wherein the first connecting plate is defined with a first mounting hole, the cover is defined with a second mounting hole corresponding to the first connecting hole, and a locking member is provided to detachably connect the first connecting plate to the cover through the first mounting hole and the second mounting hole.

19. A cooking device, comprising:
a body having an oil draining port; and
an oil guiding structure comprising:
an oil guiding pipe comprising a first end and a second end, the first end defined with an oil inlet, and the second end defined with an oil outlet;
a cover comprising: a first surface, a second surface, and a first opening; the first opening running through the first surface and the second surface; and the second surface provided with a first snap-fit part; and
an oil collecting barrel having a first accommodating space inside and defining a second opening; a side of the oil collecting barrel provided with a second snap-fit part; the second end of the oil guiding pipe passing through the first opening and connected to the cover to allow the first opening to be in communication with the oil outlet; the first accommodating space being in communication with the first opening through the second opening; and the second snap-fit part being rotatably connected with the first snap-fit part to allow the oil collecting barrel and the cover to be detachably assembled;
wherein the first snap-fit part is locked with the second snap-fit part in response to the oil collecting barrel being coaxially rotated to a first angle relative to the cover; and the first snap-fit part is unlocked with the second snap-fit part in response to the oil collecting barrel being coaxially rotated to a second angle relative to the cover; the oil guiding structure is detachably assembled with the body to allow the oil draining port to be in communication with the oil inlet.

20. The cooking device according to claim 13, wherein the body is provided with an oil draining pipe protruding from an outer wall of the body, a surface of the oil draining pipe is defined with the oil draining port, the oil draining pipe is provided with a connecting part, the oil guiding pipe is defined with a connecting groove, and the oil guiding pipe and the oil draining pipe are detachably sleeved with each other through the connecting groove and the connecting part.

* * * * *